UNITED STATES PATENT OFFICE.

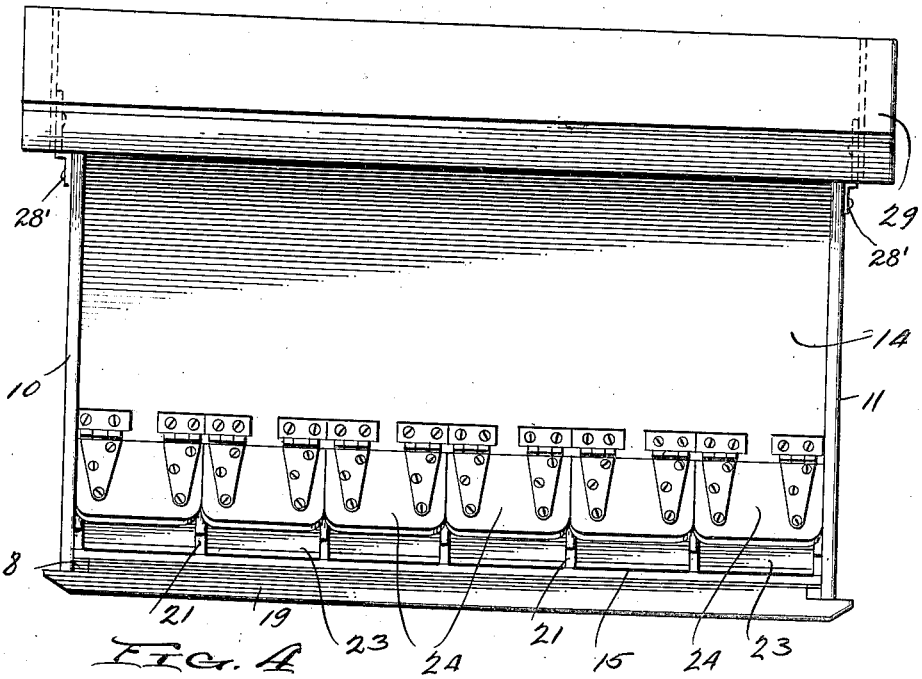
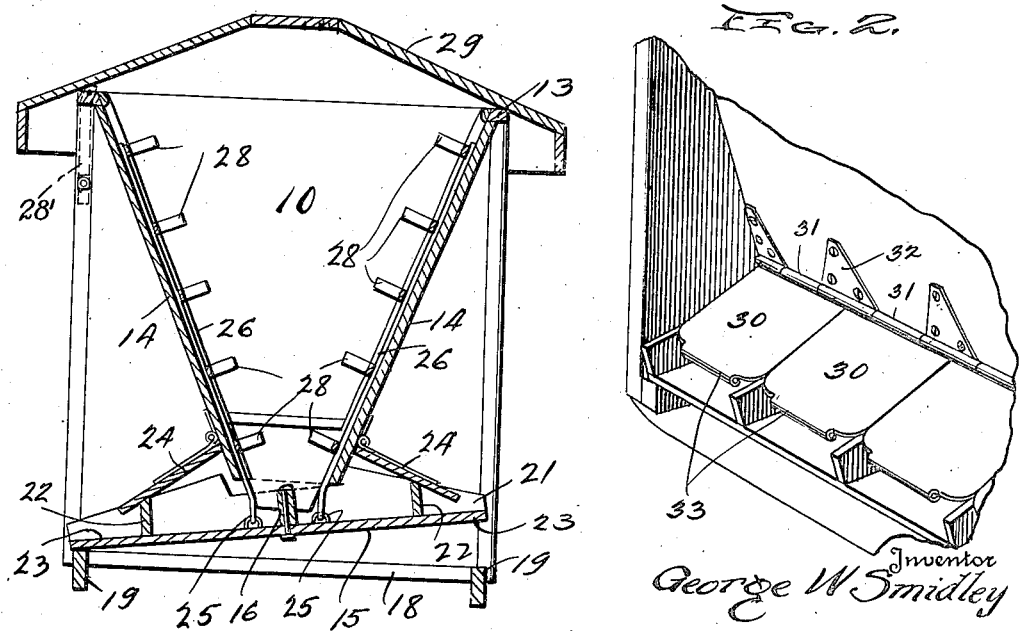

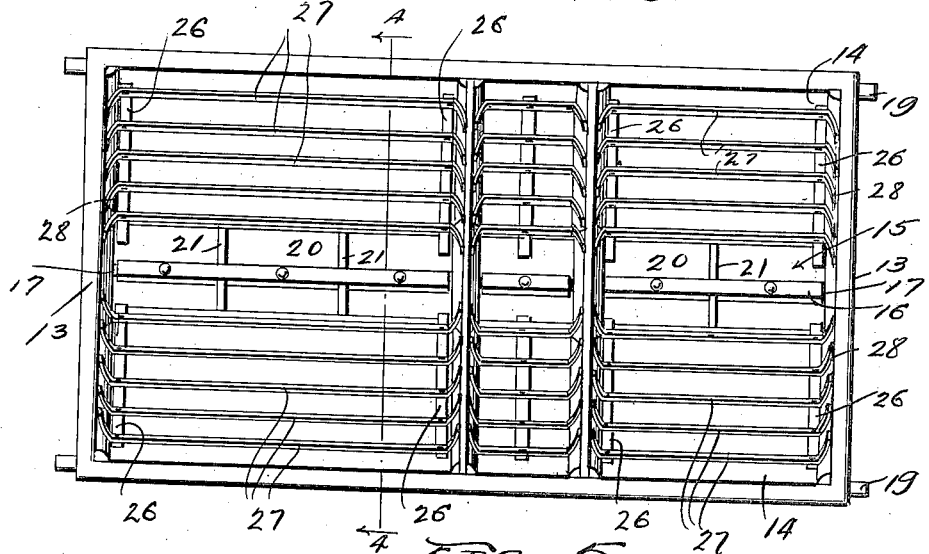
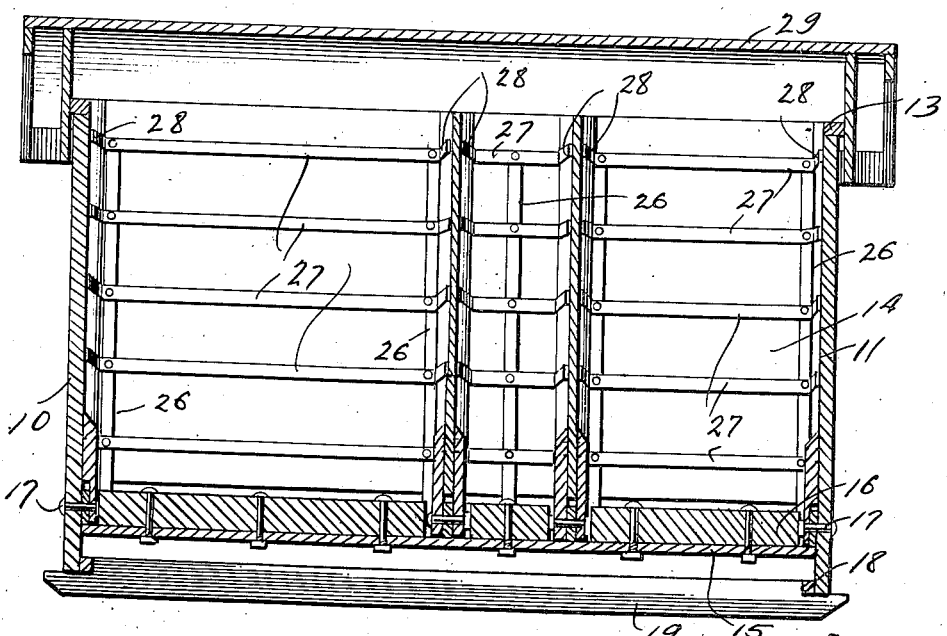

GEORGE W. SMIDLEY, OF NEW HOLLAND, OHIO.

HOG FEEDER.

1,417,212. Specification of Letters Patent. Patented May 23, 1922.

Application filed September 23, 1919, Serial No. 325,765. Renewed August 11, 1921. Serial No. 491,648.

*To all whom it may concern:*

Be it known that I, GEORGE W. SMIDLEY, a citizen of the United States, residing at New Holland, in the county of Pickaway, State of Ohio, have invented certain new and useful Improvements in Hog Feeders; and I do hereby declare the following to be a full, clear, and exact description of the invention, such as will enable others skilled in the art to which it appertains to make and use the same.

This invention relates to new and useful improvements in feed troughs and particularly to troughs for feeding hogs.

One object of the invention is to provide a novel and improved device of this character wherein the animals operate means for agitating the feed within the hopper so that the feed cannot cake against the sides and in the corners.

Another object is to provide a novel and improved device of this character wherein the hogs have individual feeding sections and platforms on which they may step, whereby crowding is prevented, and danger of getting mud and dirt in the feed eliminated.

Other objects and advantages will be apparent from the following description when taken in connection with the accompanying drawings.

In the drawings:

Figure 1 is a front elevation of a hog feeding trough made in accordance with my invention.

Figure 2 is a perspective view showing a modified form of the gravity doors.

Figure 3 is a top plan view of the feeder with the cover removed.

Figure 4 is a vertical transverse sectional view taken on the line 4—4 of Figure 3, to show the rocking bottom and agitator.

Figure 5 is a vertical longitudinal sectional view taken centrally through the feeder.

Referring particularly to the accompanying drawings, 10 and 11 represent the vertical end walls of the device. A rectangular frame 13 is secured to the top of the end walls and secured to the longer sides of this frame, and inclining downwardly and inwardly, are the side walls 14 of the hopper in which the feed is deposited and from which it is fed. The lower edges of the walls 14 terminate at suitable distances above the bottom 15 of the trough. This bottom projects at both of its longer edge portions beyond the lower edges of the walls 14 and terminates at the vertical edges of the end walls, as clearly seen in the drawing. Secured to the upper face of the bottom 15, and extending longitudinally on the median line thereof, and within the hopper, is a strip 16, the ends of which are supported on the end walls 10 and 11 by the pivots 17. These pivots are disposed at such heights that the bottom 15 is supported above the lower frame 18, which carries the skids or runners 19, whereby the said bottom is adapted to rock back and forth. The bottom is divided into a plurality of compartments 20 which extend transversely of the bottom, by means of the vertical partitions 21, said partitions extending to the outer longer edges of the bottom. At a suitable distance inwardly from each longer edge of the bottom there are secured the longitudinally extending partitions 22, each being disposed between a pair of the transverse partitions and thus dividing the outer portions of the transverse compartments to form outer stalls 23 on which the hogs place their front feet while eating from the portions of the compartments inwardly of the partitions 22. These partitions 22 serve to prevent the hogs getting their feet in the food, as will be readily understood. Hinged to each of the side walls 14 are the gravitating doors 24, the same normally resting on the inclined outer portions of the transverse partitions, with their outer or free edges projecting beyond the partitions 22, to permit the hogs to get their noses thereunder and lift them. The outer corners of each door 24 are rounded, as clearly seen in the drawing. As soon as a hog withdraws from the trough the door falls into closed position and cannot be opened by smaller animals, nor blown open by the wind, such as is experienced with doors which must be pushed inwardly by the animal. In this inwardly opening door there is danger of the animal getting the front feet or the nose caught under the door.

Carried by the intermediate portions of the bottom 15 are the upwardly extending members 25, and loosely connected to these members are the upwardly extending parallel bars 26, the same lying against the inner faces of the inclined side walls 14. Connected to and extending between these bars 26 are the transverse bars 27, the ends of which are turned angularly, as shown at 28 to engage in the angles or corners of the hopper at the junctures of the sides and ends of the hopper, to scrape the feed from said corners. It will be noted that the frames are supported on the bottom at opposite sides of the rocking pivot of said bottom, whereby when the said bottom is rocked by the weight of the animals on either side, the frames comprising the bars 26 and 27, will move upwardly and downwardly to scrape the caked feed from the sides of the hopper and thus prevent any tendency of the feed to clog, which would tend to interfere with the proper operation of the device.

Secured to the end walls by the hinges 28' is a cover 29 the ends and sides of which project beyond the ends and sides of the hopper to protect the hopper and its contents, as well as the hogs, while eating, from the rain.

By arranging the individual doors and compartments, there is no danger of a hog opening more than one door at a time. It will also be noted that the outer ends of the partitions 21 extend slightly beyond the outer free ends of the doors 24, thereby precluding the entrance of the hog's nose into more than one feeding compartment at one time.

As clearly shown in Figure 2, the doors are formed of metal, and each door 30 has a central rolled bead 31 on its upper end which register with the adjacent legs of two adjacent inverted V-shaped metal plates secured to the wall of the trough, as shown at 32. Each of the legs of the plates 32 is formed with a rolled lower end 33, and when all of the beads of the doors and the rolled ends of the legs are in alignment a common pivot pin or rod is slipped through them, whereby all of the doors are mounted on the same pivot.

The lower end of each of the doors 30 is formed with a rolled rim 34 which presents a perfectly smooth edge underneath which the animal pokes its nose. This is especially useful where an animal has a ring in its nose, thus obviating the danger of the ring catching in the edge of the door. It will be noted that this rolled rim is formed beneath the lower edge of the door.

What is claimed is:

1. A hog feeding device comprising a feed hopper having inclined side walls, a bottom for the hopper arranged to be rocked by the weight of the animals when applied to either of the side portions of said bottom, feeding compartments on said side portions, platform portions outwardly of the feeding compartments for the feet of the animals, and means connected with the bottom and slidable on the said inclined sides for agitating the feed within the hopper.

2. A hog feeding device comprising a feed hopper having a rocking bottom, transverse partitions dividing the bottom into feeding compartments, individual doors for the compartments mounted for normal gravitation onto the partitions into closed position, said partitions extending beyond the outer free ends of the doors whereby each animal can open only one door at a time, thus preventing crowding and loss of feed.

3. A hog feeding device comprising a feed hopper including inclined side walls, a transversely rockable bottom for the hopper, the side portions of the bottom extending beyond the lower ends of the side walls, transverse partitions on the bottom dividing the bottom into a plurality of feeding compartments, gravity closed doors for the individual compartments, and longitudinal partitions between the transverse partitions dividing the outer portions of the bottom into platforms for the feet of the animals, said doors having their outer corners rounded to prevent sidewise rooting by the animals.

4. A hog feeding device comprising a hopper having inclined sides, a rocking receptacle below the hopper arranged to be moved by the weight of the animals at opposite sides of the hopper to jar feed from the hopper, and vertical scraping elements carried by the rocking bottom at opposite sides of the longitudinal center thereof and contacting throughout their length with the inclined sides to scrape the feed therefrom and prevent caking of the feed.

5. In a stock-feeder, the combination of an open-bottomed feed-receptacle, supports therefor to hold it a little distance above ground, a tilting platform provided with troughs adjacent to the receptacle and projecting outside the troughs, to serve as foot supports for the animals and middle supports for said platform.

In testimony whereof, I affix my signature.

GEORGE W. SMIDLEY.